US012507631B2

(12) United States Patent
Lohrentz et al.

(10) Patent No.: US 12,507,631 B2
(45) Date of Patent: Dec. 30, 2025

(54) DIVIDER POINTS, HARVESTING HEADERS CONFIGURED TO RECEIVE REMOVABLE DIVIDER POINTS, AND RELATED METHODS (71) Applicant: AGCO Corporation, Duluth, GA (US)

(72) Inventors: Randall Lohrentz, Buhler, KS (US); William H. Thompson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 886 days.

(21) Appl. No.: 17/629,769

(22) PCT Filed: Jul. 16, 2020

(86) PCT No.: PCT/IB2020/056681
§ 371 (c)(1),
(2) Date: Jan. 24, 2022

(87) PCT Pub. No.: WO2021/014285
PCT Pub. Date: Jan. 28, 2021

(65) Prior Publication Data
US 2022/0248606 A1  Aug. 11, 2022

Related U.S. Application Data (60) Provisional application No. 62/878,042, filed on Jul. 24, 2019.

(51) Int. Cl.
*A01D 63/04* (2006.01)
*A01D 41/06* (2006.01)
(52) U.S. Cl.
CPC .............. *A01D 63/04* (2013.01); *A01D 41/06* (2013.01)

(58) Field of Classification Search
CPC ........ A01D 65/00–65/08; A01D 63/00–63/04; A01D 45/021; A01D 41/00–41/16
See application file for complete search history.

(56) References Cited

U.S. PATENT DOCUMENTS 607,099 A * 7/1898 Wadleigh ............... A01D 65/02
56/312
2,273,014 A * 2/1942 Blackledge ............ A01D 65/02
56/313
(Continued)

FOREIGN PATENT DOCUMENTS

EP          0045015 A1    2/1982
WO    WO-2015058230 A1 *  4/2015  ............. A01D 65/02

OTHER PUBLICATIONS

UK Intellectual Property Office, Search report for related UK Application No. GB2000393.5, dated Jul. 8, 2020.
(Continued)

*Primary Examiner* — Joseph M Rocca
*Assistant Examiner* — Madeline I Runco (57) ABSTRACT A harvesting header includes a header frame structured to be coupled to a crop-harvesting machine, dividers at each end of the header frame, and at least one harvesting tool carried by the header frame between the first divider and the second divider. Each divider defines a tube therein structured to slidingly receive a divider point, Latches are configured to be partially within the tubes in one position, and entirely outside the tubes in another position, A divider point for a harvesting header includes a longitudinal member having a straight portion with a catch defined therein configured to be received within a tube defined by a divider of the harvesting header and a body extending from the longitudinal member, Methods of transporting and preparing harvesting headers are also disclosed.

6 Claims, 8 Drawing Sheets (56) References Cited

U.S. PATENT DOCUMENTS

| | | | | |
|---|---|---|---|---|
| 2,281,660 | A | * | 5/1942 | Barr .................. A01D 63/04 |
| | | | | 56/314 |
| 2,394,838 | A | * | 2/1946 | Beltz ................. A01D 65/02 |
| | | | | 56/312 |
| 3,995,412 | A | | 12/1976 | Gaeddert et al. |
| 5,444,968 | A | | 8/1995 | Barton |
| 9,226,447 | B2 | * | 1/2016 | Noll .................. A01D 41/148 |
| 2014/0083074 | A1 | | 3/2014 | Kiel et al. |
| 2016/0183466 | A1 | * | 6/2016 | Long ................. A01D 57/22 |
| | | | | 56/119 |

OTHER PUBLICATIONS

European Patent Office, International Search Report related to International Patent Application No. PCT/IB2020/056681, mail date Sep. 18, 2020.

* cited by examiner

DIVIDER POINTS, HARVESTING HEADERS CONFIGURED TO RECEIVE REMOVABLE DIVIDER POINTS, AND RELATED METHODS

CROSS-REFERENCE TO RELATED APPLICATION

This application claims the benefit of the filing date of U.S. Provisional Patent Application 62/808,042, "Divider Points, Harvesting Headers Configured to Receive Removable Divider Points, and Related Methods," filed Jul. 24, 2019, the entire disclosure of which is incorporated herein by reference.

FIELD

This disclosure relates to harvesting headers for use with self-propelled crop harvesting machines, and particularly to dividers and divider points.

BACKGROUND

Self-propelled agricultural harvesters are well known and include, by way of example, combine harvesters, windrowers, and forage harvesters, all of which typically include a frame or chassis, an operator cab, an engine, and ground-engaging wheels or tracks. A cutting or pick-up header is often carried by the harvester, the header typically being considerably wider than the harvester and mounted to the front side of a feederhouse.

Crop material collected by the header is conveyed into the feederhouse before being conveyed in a generally rearward direction to crop-processing apparatus. In the case of a combine harvester, the processing apparatus serves to thresh the crop material and separate grain therefrom, whereas, in the case of a forage harvester or windrower, the crop material is typically passed through conditioning rollers.

Headers typically include a pair of crop dividers on opposite ends of a crop-gathering mechanism. The dividers divide and lift the crop, and guide it inwardly toward the crop-gathering mechanism, where it may be harvested by one or more harvesting tools, such as a set of oscillating blades. Dividers may carry divider points, which may extend forward or upward from the front of the divider. The divider points may be of various designs, depending on the crop to be harvested. Some divider points may make the header too wide to be transported lengthwise on public roadways without special travel restrictions (e.g., pilot cars, route limitations, etc.), and so may be removed before the header is moved from one field to another.

BRIEF SUMMARY

In some embodiments, a harvesting header has a header frame structured to be coupled to a crop-harvesting machine, a first divider at a first end of the header frame, a first latch, a second divider at a second end of the header frame opposite the first end, a second latch, and at least one harvesting tool carried by the header frame between the first divider and the second divider. The first divider defines a first tube therein, and the first tube is structured to slidingly receive a first divider point. The second divider defines a second tube therein, and the second tube is structured to slidingly receive a second divider point. The first latch in a first position is partially within the first tube, and the first latch in a second position is entirely outside the first tube. The second latch in a first position is partially within the second tube, and the second latch in a second position is entirely outside the second tube.

A divider point for a harvesting header includes a longitudinal member having a straight portion with a catch defined therein configured to be received within a tube defined by a divider of the harvesting header and a body extending from the longitudinal member. The longitudinal member has a catch defined therein.

A method of preparing a harvesting header includes releasing a first latch to enable a first longitudinal member of a first divider point to slide within a first tube defined in the first divider, sliding the first longitudinal member from the first tube to remove the first divider point from the first divider, releasing a second latch to enable a second longitudinal member of a second divider point to slide within a second tube defined in the second divider, and sliding the second longitudinal member from the second tube to remove the second divider point from the second divider.

A method of transporting a harvesting header comprising a header frame carrying a first divider and a second divider, each of the first divider and the second divider defining channels therein. The method comprises placing a harvesting header on a trailer, pulling the trailer with the harvesting header thereon on a public roadway, removing the harvesting header from the trailer, sliding a longitudinal member of a first divider point into the tube in the first divider to engage a first latch to attach the first divider point to the first divider, sliding a longitudinal member of a second divider point into the tube in the second divider to engage a second latch to attach the second divider point to the second divider, attaching the harvesting header to a crop-harvesting machine, and propelling the crop-harvesting machine with the attached harvesting header through an agricultural field.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not actual views of any header or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

As used herein, the term "tube" means and includes an enclosed elongated structure. The tube may have a generally constant cross section, which may be square, rectangular, rounded, or another shape.

Figure 1:
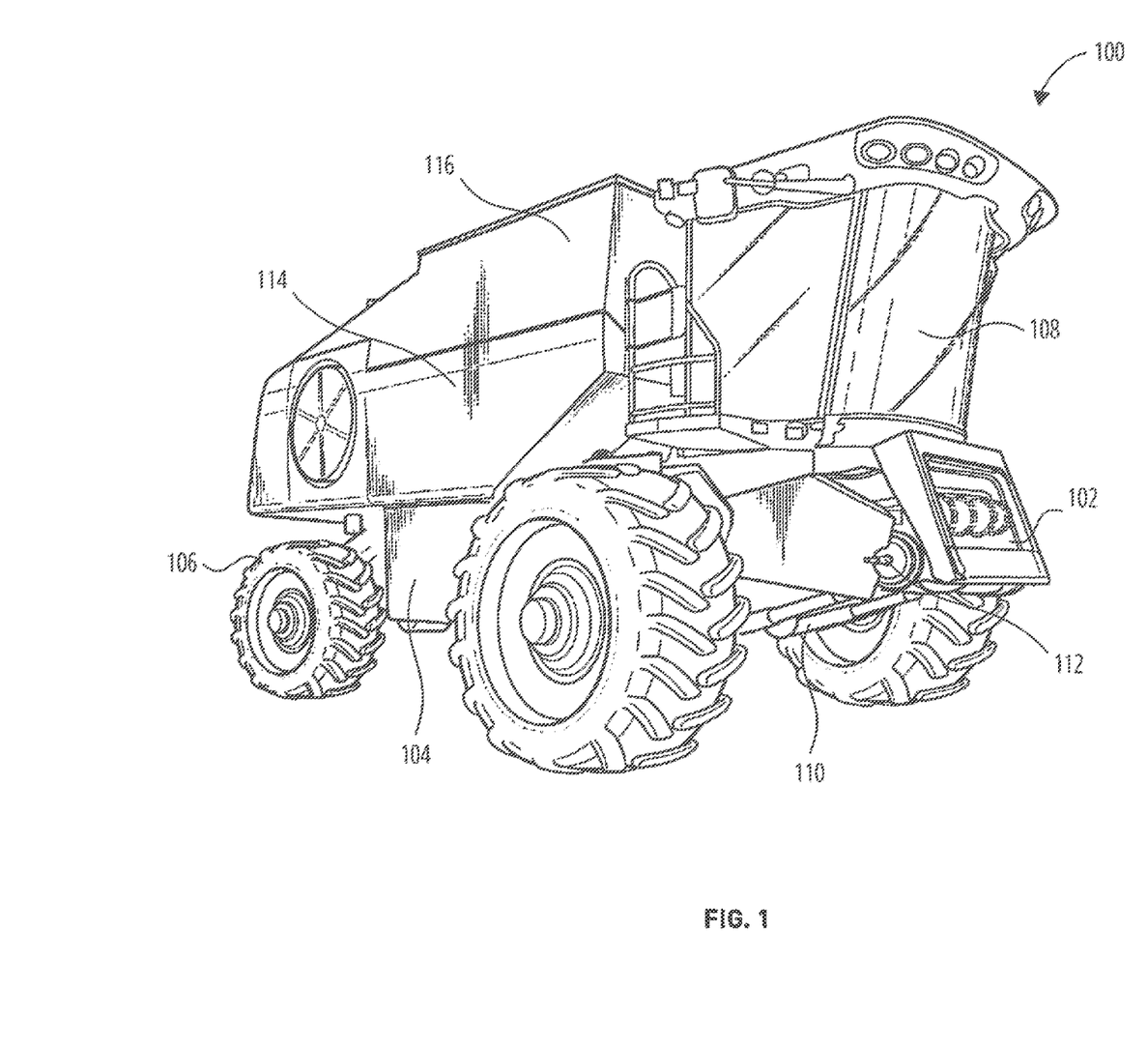
FIG. 1 is a simplified front perspective view of an example combine harvester.

FIG. 1 illustrates an example agricultural harvester embodied as a combine harvester 100. In the context of the present disclosure, the example combine harvester 100 is merely illustrative, and other machines and/or implements with like functionality may deploy certain embodiments disclosed herein, such as windrowers, forage harvesters, etc. The example combine harvester 100 is shown in FIG. 1 without a header attached, and includes a feederhouse 102 carried by a chassis 104 supported by wheels 106. An operator cab 108 is mounted to the chassis 104. In some embodiments, other or additional forms of travel may be used, such as tracks. Hydraulic cylinders 110 are shown affixed to the underside of the feederhouse 102 on one end and to the chassis 104 on the other end. The feederhouse 102 may move (e.g., up and down, pitch, tilt, etc.) based on actuation of the hydraulic cylinders 110, which causes a detachably coupled header to also be raised, lowered, pitched, and/or tilted. A rotating shaft 112 may be configured to provide mechanical power to a header during operation of the combine harvester 100. The rotating shaft 112 may be configured to operate at various speeds, as described in, for example, U.S. Pat. No. 9,434,252, "Power Takeoff Drive System for a Vehicle," issued Sep. 6, 2016.

In general, the combine harvester 100 cuts crop materials (e.g., using the header), wherein the cut crop materials are delivered to the front end of the feederhouse 102. Such crop materials are moved upwardly and rearwardly within and beyond the feederhouse 102 (e.g., by a conveyer) until reaching a processing system 114 comprising a thresher rotor. In one embodiment, the thresher rotor may comprise a single, transverse rotor, such as that found in a Gleaner® Super Series Combine by AGCO. Other designs may be used, such as axial-based, twin rotor, or hybrid designs. The thresher rotor processes the crop materials in known manner and passes a portion of the crop material (e.g., heavier chaff, corn stalks, etc.) toward the rear of the combine harvester 100 and another portion (e.g., grain and possibly light chaff) through a cleaning process in known manner. In the processing system 114, the crop materials undergo threshing and separating operations. In other words, the crop materials are threshed and separated by the thresher rotor operating in cooperation with well-known foraminous processing members in the form of threshing concave assemblies and separator grate assemblies, with the grain (and possibly light chaff) escaping through the concave assemblies and the grate assemblies and to a cleaning system located beneath the processor to facilitate the cleaning of the heavier crop material. Bulkier stalk and leaf materials are generally retained by the concave assemblies and the grate assemblies and are discharged out from the processing system 114 and ultimately out of the rear of the combine harvester 100. The cleaned grain that drops to the bottom of the cleaning system is delivered by a conveying mechanism that transports the grain to an elevator, which conveys the grain to a grain bin 116 located at the top of the combine harvester 100. Any remaining chaff and partially or unthreshed grain is recirculated through the processing system 114 via a tailings return conveying mechanism. Because combine processing is known to those having ordinary skill in the art, further discussion thereof is omitted here for brevity. In embodiments in which the agricultural harvester is a windrower or forage harvester, the processing system 114 may include conditioning rollers rather than separation devices.

Figure 2:
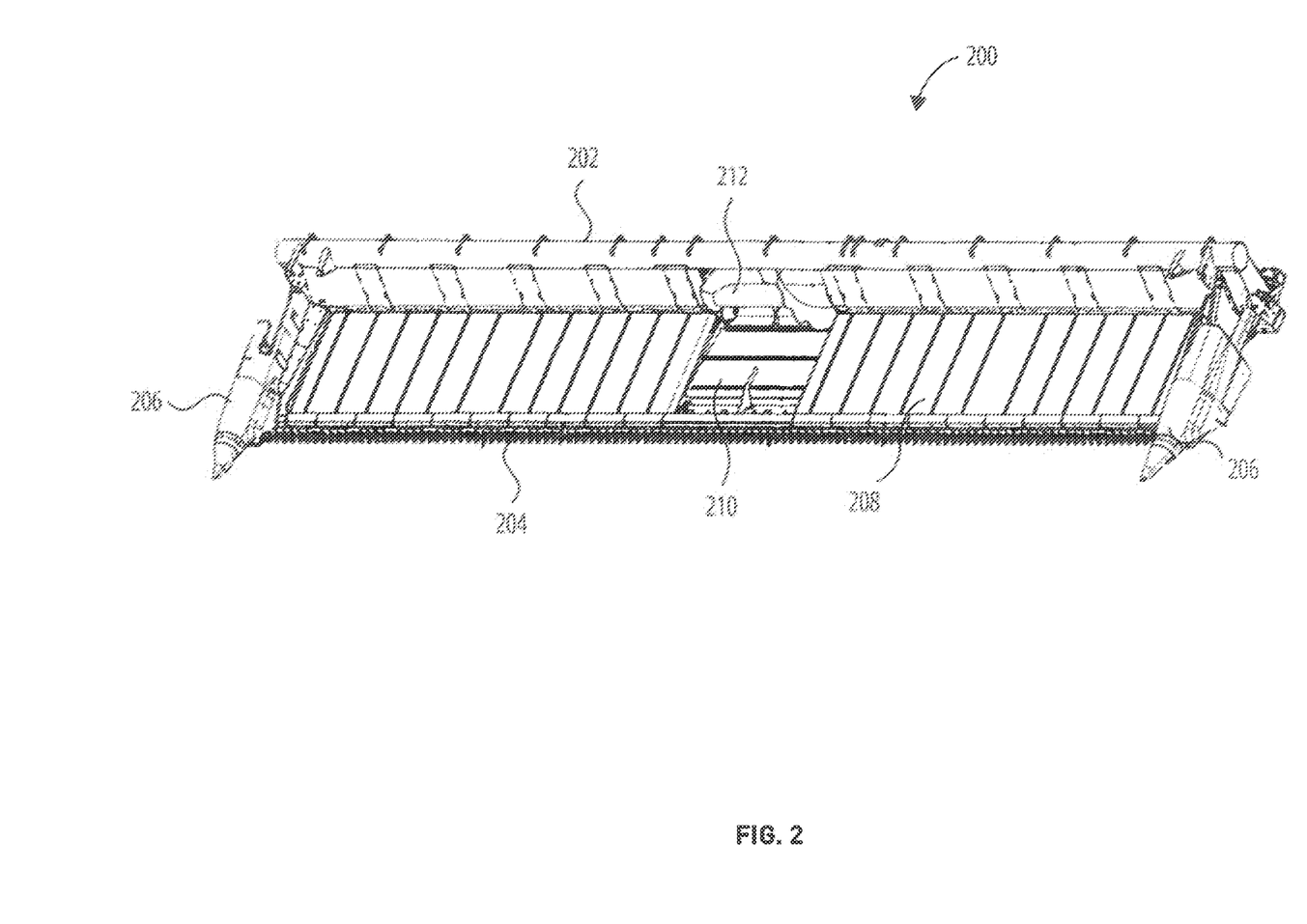
FIG. 2 illustrates a header that may be used with combine harvester of FIG. 1.

FIG. 2 is a simplified view of a header 200 that may be attached to the feederhouse 102 of the combine harvester 100 (FIG. 1) and used to harvest a crop. The header 200 includes a header frame 202, at least one harvesting tool 204, and dividers 206 at either end of the header 200. The harvesting tool 204 is depicted as an oscillating blade, but may be any other tool used for harvesting crops that come into contact with the harvesting tool 204. The dividers 206 may serve to define boundaries between crop material being harvested and standing crop (typically, material to be harvested in a subsequent pass through the field) by directing crop material on one side of the divider 206 toward the harvesting tool 204 and crop material on the other side of the divider 206 away from the harvesting tool 204.

The header 200 may also include side drapers 208, a center draper 210, and/or a collecting auger 212 that together may transport cut crop material toward the feederhouse 102 of the combine harvester 100. Headers are described in more detail in, for example, U.S. Pat. No. 7,886,511, "Draper Head with Flexible Cutterbar Having Rigid Center Section," issued Feb. 15, 2011; U.S. Pat. No. 10,194,588, "Corn Header Configured to Reduce Kernel Losses," issued Feb. 5, 2019; and U.S. Pat. No. 8,857,143, "Frame for Harvesting Header with Continuous Section," issued Oct. 14, 2014.

Figure 3:
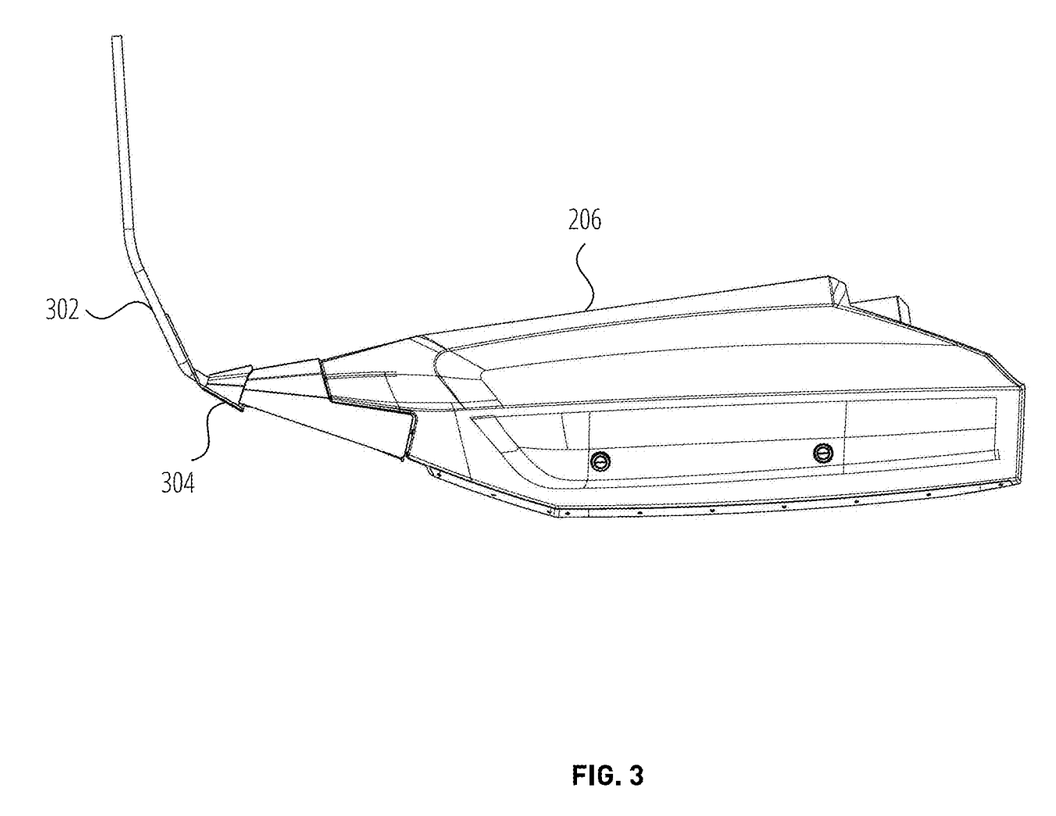
FIG. 3 illustrates a divider of the header shown in FIG. 2 and a divider point that may be attached to the header.

FIG. 3 is a simplified side view showing more detail of one divider 206 of the header 200 shown in FIG. 2. A divider point 302 is secured to the divider 206 and, in the embodiment shown, includes a rod extending forward and upward from the divider 206. The divider point 302 may also include a shroud 304 surrounding an interface between the divider point 302 and the divider 206.

Figure 4:
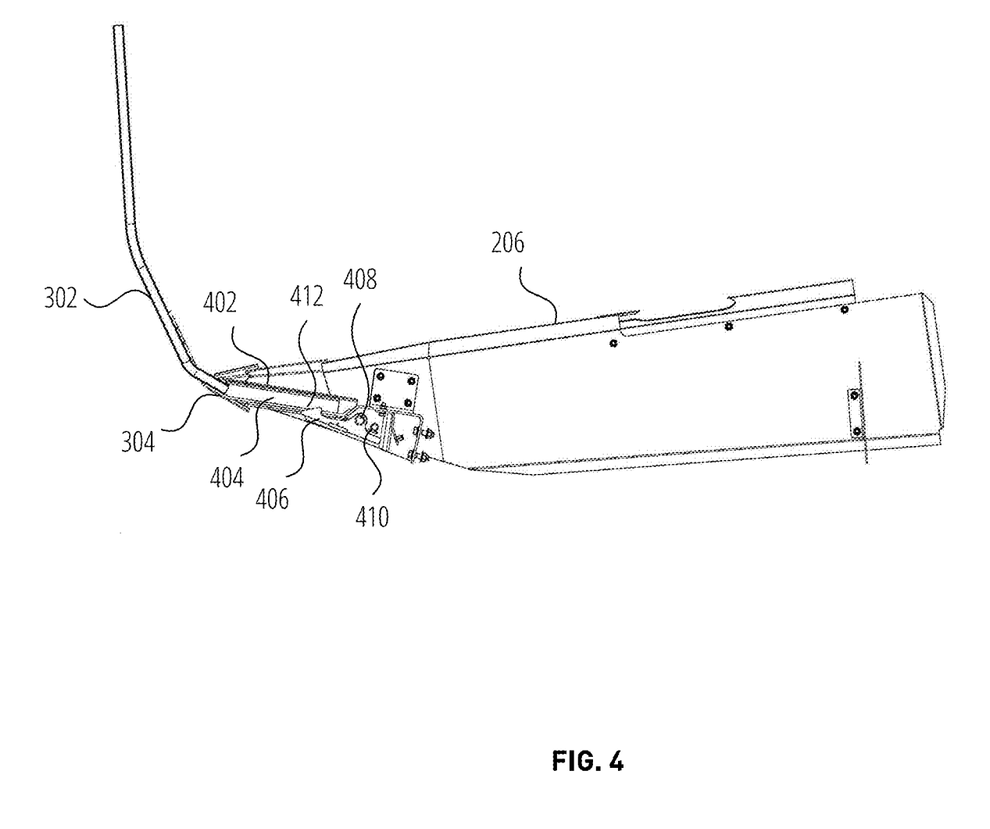
FIG. 4 illustrates a side cutaway view of the divider and divider point shown in FIG. 3.

FIG. 4 is a simplified cutaway view of the divider 206 and the divider point 302. The divider 206 has a hollow tube 402 in a forward end thereof, and the divider point 302 has a longitudinal member 404 with a straight portion sized to fit within the tube 402. The longitudinal member 404 may be a solid shaft or a hollow tube. Thus, the divider point 302 can be connected to the divider 206 by sliding the longitudinal member 404 into the tube 402. The tube 402 and longitudinal member 404 may each have a corresponding non-round cross section, such that the longitudinal member 404 does not rotate within the tube 402. This provides stability of the divider point 302 with respect to the header 200. For example, the tube 402 and longitudinal member 404 may have rectangular cross-sections, keyways, splines, hexagon cross-sections, obround shapes, or any other shapes or obstructions to prevent rotation of the longitudinal member 404 within the tube 402.

The divider 206 may also include a latch 406 to retain the divider point 302. The latch 406 may rotate about a pin 408 between a first position, in which the latch 406 is partially within the tube 402, and a second position, in which the latch 406 is entirely outside the tube 402. A spring 410 or other biasing member may be configured to urge the latch 406 toward the first position, such that, absent an external force on the latch 406, the latch 406 retains the longitudinal member 404 of the divider point 302. The latch 406 may hook to the longitudinal member 404 in a catch 412. The catch 412 may be a hole or slot formed through a wall of the longitudinal member 404 if the longitudinal member 404 is a hollow tube, or a recess in the longitudinal member 404 if the longitudinal member 404 is a solid shaft. The divider point 302 may be removed from the divider 206 by releasing the latch 406. The latch 406 may beneficially be configured to be operated without tools and with one hand, so that a single person can release the latch 406 and remove the divider point 302. For example, one hand can be used to push the latch 406, and the other hand can be used to pull the divider point 302 outward (i.e., in the direction of the longitudinal axis of the tube 402).

The shroud 304 may keep crop material out of the tube 402 and may keep accumulated crop material from interfering with the smooth release and installation of the divider point 302.

Figure 5:
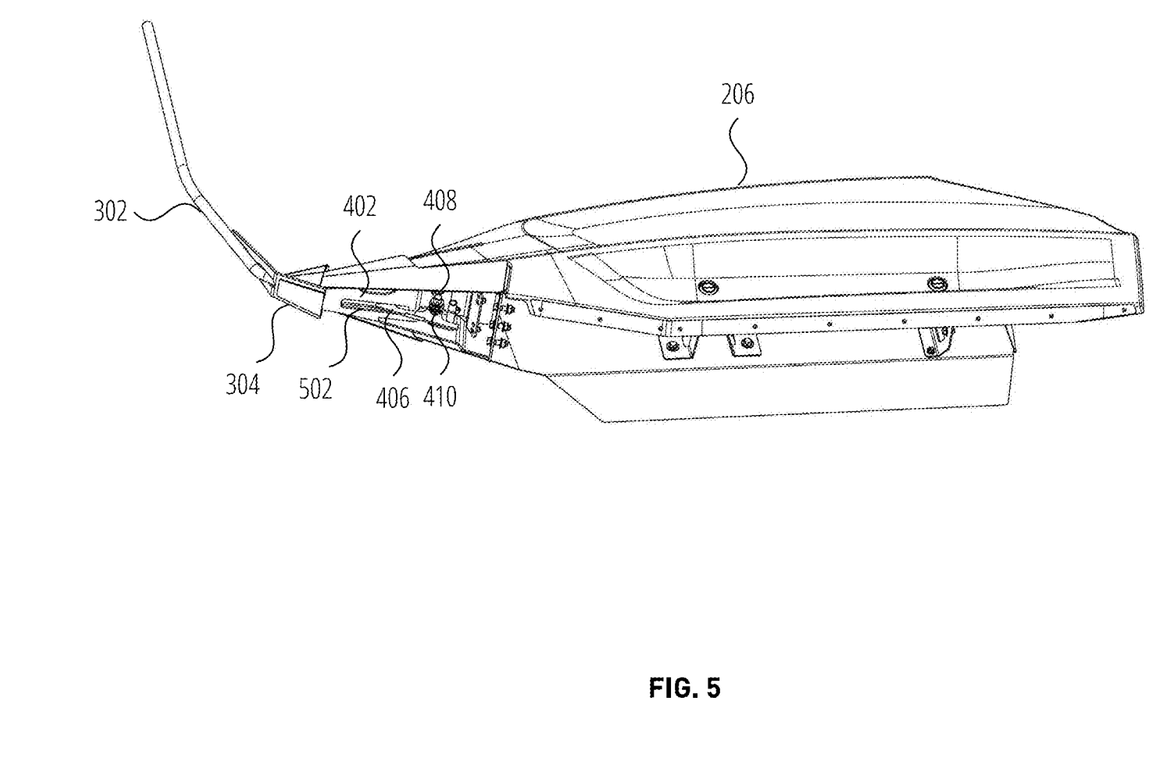
FIG. 5 is another view of the divider and divider point shown in FIG. 3.

FIG. 5 is another view of the divider 206 and the divider point 302 from below and to the side. As shown in FIG. 5, the wall of the tube 402 may have a slot 502, through which the latch 406 can attach to the longitudinal member 404. The longitudinal member 404 may have a corresponding catch 412 (FIG. 4), and the latch 406 may hook the catch 412 of the longitudinal member 404.

Figure 6:
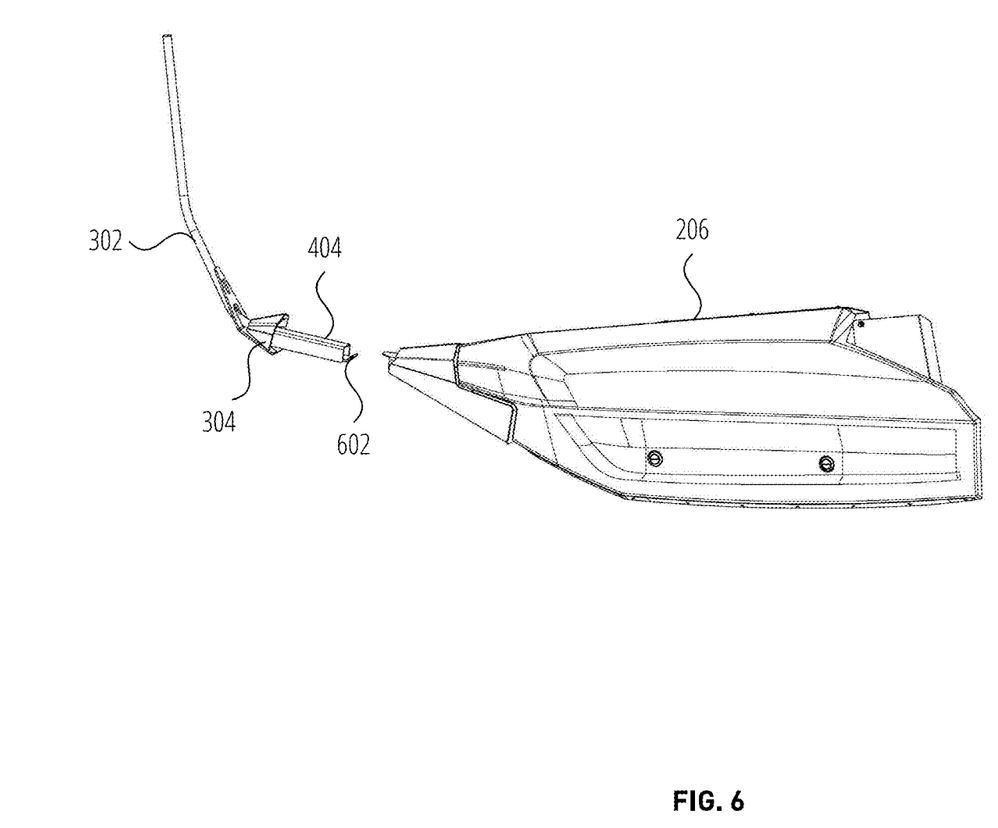
FIG. 6 illustrates the divider point shown in FIG. 3 separated from the divider.

FIG. 6 is a simplified side view of the divider point 302 removed from the divider 206. As shown, the longitudinal member 404 may have a tab 602 that pushes the latch 406 (FIG. 4 and FIG. 5) to enable the longitudinal member 404 to slide into the tube 402. The rod of the divider point 302 may be oriented at an angle with respect to the longitudinal member 404.

Figure 7:
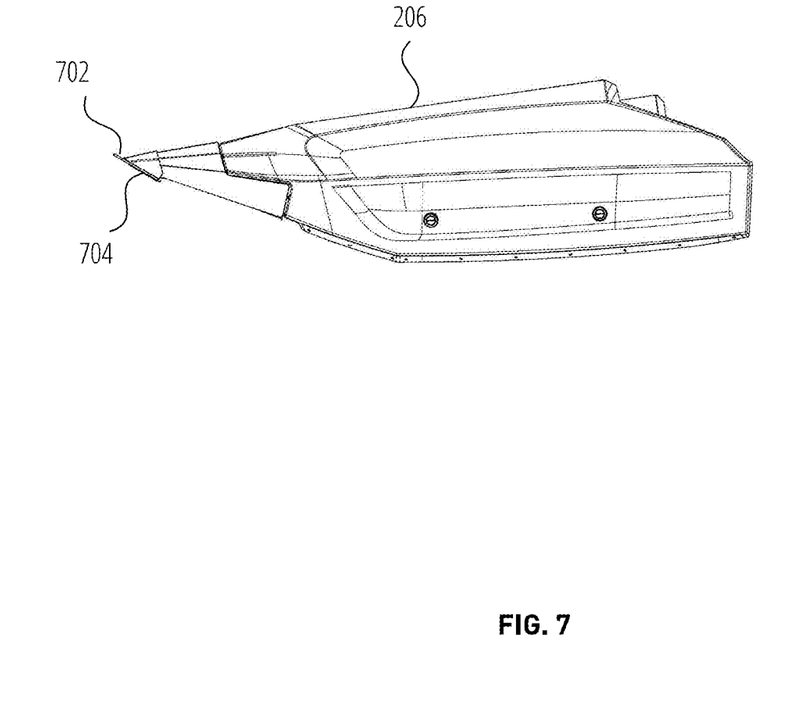
FIG. 7 illustrates another divider point that may be used with the divider shown in FIG. 3.

FIG. 7 is a simplified side view of another divider point 702 installed on the divider 206. The divider point 702 may include a shroud 704, similar to the divider point 302 of FIG. 3, but the divider point 702 may have a blunt tip, rather than a rod. The divider point 702 may be used for crops that are lower to the ground than the divider point 302. The divider point 702 may have an attachment structure similar to the divider point 302, and thus the divider point 702 may be interchangeable with the divider point 302 on the header 200. Thus, depending on the crop to be harvested, an operator may install the divider point 702 or the divider point 302.

The header 200 disclosed herein may have certain advantages over conventional headers. In particular, it may be relatively simple to change divider points, and the change may be performed by a single person without tools. Furthermore, the divider points may be easily removed for transport over public roadways, because the header 200 loaded lengthwise on a trailer may be narrower if its divider points are removed.

Figure 8:
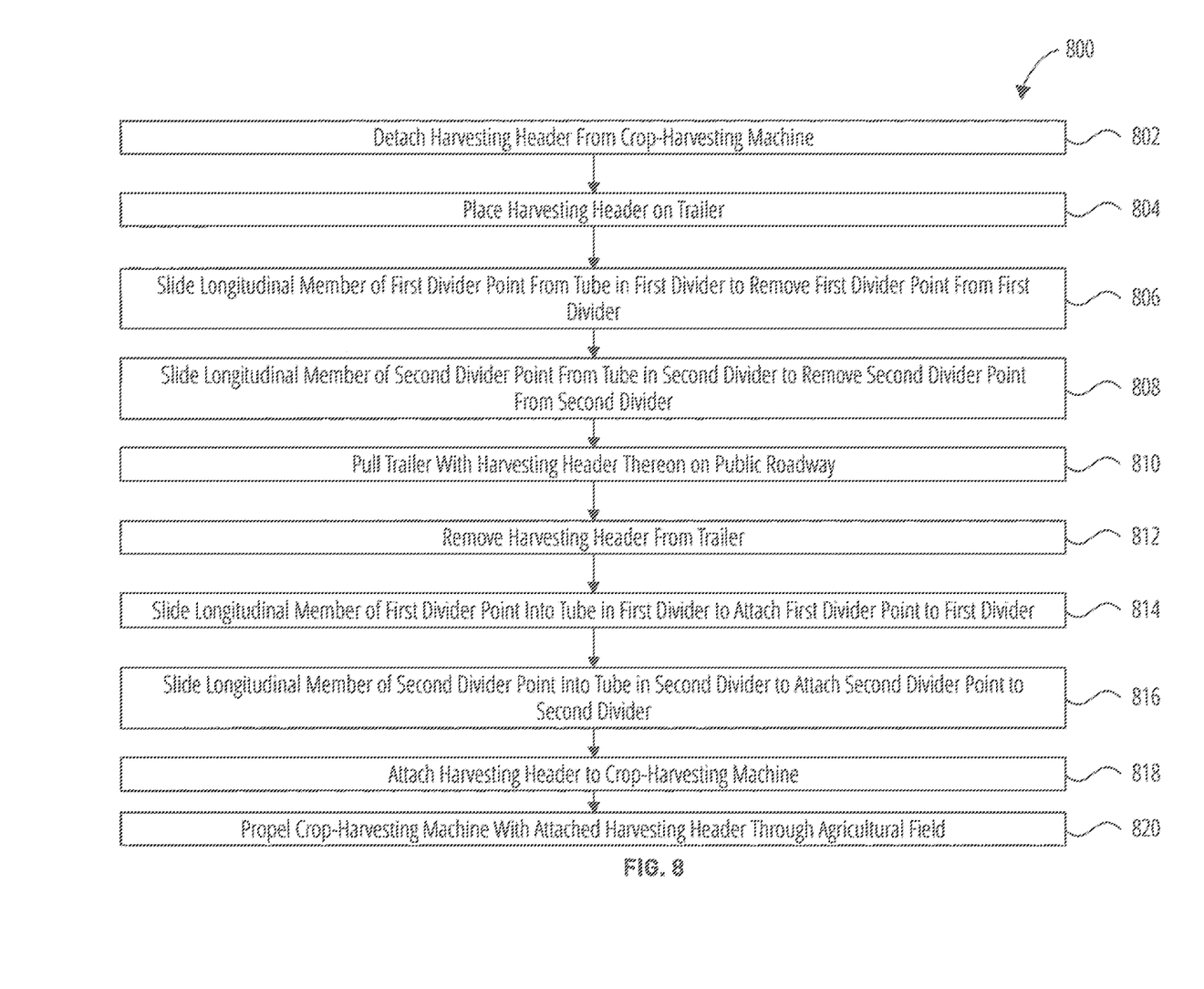
FIG. 8 is a simplified flow chart illustrating a method of preparing, transporting, and/or operating a combine harvester and harvesting header.

FIG. 8 is a simplified flow chart illustrating a method 800 of preparing, transporting, and/or operating a combine harvester and harvesting header, such as the combine harvester 100 shown in FIG. 1 and header 200 shown in FIG. 2. As shown in block 802, the harvesting header may be detached from a crop-harvesting machine. The harvesting header includes a header frame carrying a first divider and a second divider, each of which define channels therein.

In block 804, the harvesting header is placed end-wise on a trailer. In block 806, a longitudinal member of a first divider point is slid from the tube in the first divider to remove the first divider point from the first divider. Similarly, in block 808, a longitudinal member of a second divider point is slid from the tube in the second divider to remove the second divider point from the second divider. The actions in block 802 through block 808 may typically be performed in a field that has been harvested, in a storage facility, etc., before transport to another field. The actions in block 802 through block 808 may be performed in any order. In block 810, the trailer with the harvesting header thereon is pulled on a public roadway. Because the divider points have been removed, the header may be narrower than the maximum allowable width for travel on certain public roadways, and thus may be transported with a single vehicle and without special permits, pilot cars, etc. The divider points may be stored on or in the trailer for transport.

At a destination, such as another field to be harvested, and as shown in block 812, the harvesting header may be removed from the trailer. In block 814, the longitudinal member of the first divider point may be slid into the tube in the first divider to attach the first divider point to the first divider. In block 816, the longitudinal member of the second divider point may be slid into the tube in the second divider to attach the second divider point to the second divider. Alternatively, longitudinal members of other divider points may be slid into the tubes if, for example, a different crop is to be harvested. In block 818, the harvesting header may be attached to a crop-harvesting machine (which may be the same crop-harvesting machine used previously or a different one). The actions in block 812 through block 818 may be performed in any order.

In block 820, the crop-harvesting machine with the attached harvesting header is propelled through an agricultural field to harvest crops.

Additional non-limiting example embodiments of the disclosure are described below.

Embodiment 1: A harvesting header for use with a crop-harvesting machine, the harvesting header comprising a header frame structured to be coupled to the crop-harvesting machine, a first divider at a first end of the header frame, a first latch, a second divider at a second end of the header frame opposite the first end, a second latch, and at least one harvesting tool carried by the header frame between the first divider and the second divider. The first divider defines a first tube therein, and the first tube is structured to slidingly receive a first divider point. The second divider defines a second tube therein, and the second tube is structured to slidingly receive a second divider point. The first latch in a first position is partially within the first tube, and the first latch in a second position is entirely outside the first tube. The second latch in a first position is partially within the second tube, and the second latch in a second position is entirely outside the second tube.

Embodiment 2: The harvesting header of Embodiment 1, wherein the first latch is configured to rotate about a first pin, and wherein the second latch is configured to rotate about a second pin.

Embodiment 3: The harvesting header of Embodiment 1 or Embodiment 2, further comprising a first spring configured to urge the first latch toward the first position and a second spring configured to urge the second latch toward the first position.

Embodiment 4: The harvesting header of Embodiment 1, further comprising a first biasing member, wherein the first biasing member urges the first latch into a position to retain the first divider point in the first tube.

Embodiment 5: The harvesting header of Embodiment 4, wherein the first biasing member is configured such that, when compressed, the first latch releases the first divider point.

Embodiment 6: The harvesting header of any one of Embodiment 1 through Embodiment 5, wherein the first divider and the second divider are adapted for installation and removal of the first divider point and the second divider point by a single person.

Embodiment 7: The harvesting header of any one of Embodiment 1 through Embodiment 6, wherein the first divider and the second divider are adapted for installation and removal of the first divider point and the second divider point by hand and without tools.

Embodiment 8: A divider point for a harvesting header comprising a longitudinal member having a straight portion with a catch defined therein configured to be received within a tube defined by a divider of the harvesting header and a body extending from the longitudinal member.

Embodiment 9: The divider point of Embodiment 8, wherein the longitudinal member exhibits a rectangular cross-section.

Embodiment 10: The divider point of Embodiment 9, wherein the longitudinal member has an outer wall defining a hollow cavity therein.

Embodiment 11: The divider point of Embodiment 12, wherein the outer wall defines a slot through the wall.

Embodiment 12: The divider point of Embodiment 8 or Embodiment 9, wherein the longitudinal member comprises a solid shaft, and wherein the catch is a recess defined by an outer surface of the solid shaft.

Embodiment 13: The divider point of any one of Embodiment 9 through Embodiment 12, further comprising a shroud at least partially surrounding an interface between the longitudinal member and the body.

Embodiment 14: The divider point of any one of Embodiment 9 through Embodiment 13, wherein the body comprises a rod oriented at an angle with respect to the longitudinal member.

Embodiment 15: A method of preparing a harvesting header having a header frame carrying a first divider and a second divider at opposite ends of the header frame. The method comprises releasing a first latch to enable a first longitudinal member of a first divider point to slide within a first tube defined in the first divider, sliding the first longitudinal member from the first tube to remove the first divider point from the first divider, releasing a second latch to enable a second longitudinal member of a second divider point to slide within a second tube defined in the second divider, and sliding the second longitudinal member from the second tube to remove the second divider point from the second divider.

Embodiment 16: The method of Embodiment 15, further comprising sliding a third longitudinal member of a third divider point into the first tube to secure the third divider point to the first divider and sliding a fourth longitudinal member of a fourth divider point into the second tube to secure the fourth divider point to the second divider.

Embodiment 17: The method of Embodiment 15 or Embodiment 16, further comprising detaching the harvesting header from a crop-harvesting machine, placing the harvesting header on a trailer, and pulling the trailer with the harvesting header thereon on a public roadway.

Embodiment 18: The method of Embodiment 17, further comprising storing the first divider point and the second divider point on or in the trailer.

Embodiment 19: The method of any one of Embodiment 15 through Embodiment 18, wherein sliding the first longitudinal member from the first tube comprises removing the first divider point from the first divider without tools, and sliding the second longitudinal member from the second tube comprises removing the second divider point from the second divider without tools.

Embodiment 20: The method of any one of Embodiment 15 through Embodiment 19, wherein sliding the first longitudinal member from the first tube comprises removing the first divider point from the first divider by a single person, and sliding the second longitudinal member from the second tube comprises removing the second divider point from the second divider by the single person.

Embodiment 21: A method of transporting a harvesting header comprising a header frame carrying a first divider and a second divider, each of the first divider and the second divider defining channels therein. The method comprises placing the harvesting header on a trailer, pulling the trailer with the harvesting header thereon on a public roadway, removing the harvesting header from the trailer, sliding a longitudinal member of a first divider point into the tube in the first divider to engage a first latch to attach the first divider point to the first divider, sliding a longitudinal member of a second divider point into the tube in the second divider to engage a second latch to attach the second divider point to the second divider, attaching the harvesting header to a crop-harvesting machine, and propelling the crop-harvesting machine with the attached harvesting header through an agricultural field.

Embodiment 22: The method of Embodiment 21, further comprising disengaging the first latch, sliding the longitudinal member of the first divider point from the tube in the first divider to remove the first divider point from the first divider, disengaging the second latch, and sliding the longitudinal member of the second divider point from the tube in the second divider to remove the second divider point from the second divider.

Embodiment 23: The method of Embodiment 21 or Embodiment 22, further comprising detaching the harvesting header from the crop-harvesting machine.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A harvesting header for use with a crop-harvesting machine, the harvesting header comprising:
    a header frame structured to be coupled to the crop-harvesting machine;
    a first divider at a first end of the header frame, the first divider defining a first tube therein, the first tube structured to slidingly receive a first divider point;
    a first latch, wherein the first latch is moveable between a first position in which the first latch is partially within the first tube, and a second position in which the first latch is entirely outside the first tube, wherein the first latch is configured to rotate about a first pin;
    a second divider at a second end of the header frame opposite the first end, the second divider defining a second tube therein, the second tube structured to slidingly receive a second divider point;
    a second latch, wherein the second latch is moveable between a first position in which the second latch is partially within the first tube, and a second position in which the second latch is entirely outside the second tube, wherein the second latch is configured to rotate about a second pin; and
    at least one harvesting tool carried by the header frame between the first divider and the second divider.

2. The harvesting header of claim 1, wherein the first divider and the second divider are adapted for installation and removal of the first divider point and the second divider point by a single person.

3. The harvesting header of claim 1, wherein the first divider and the second divider are adapted for installation and removal of the first divider point and the second divider point by hand and without tools.

4. A harvesting header for use with a crop-harvesting machine, the harvesting header comprising:
    a header frame structured to be coupled to the crop-harvesting machine;
    a first divider at a first end of the header frame, the first divider defining a first tube therein, the first tube structured to slidingly receive a first divider point;
    a first latch, wherein the first latch in a first position is partially within the first tube, and wherein the first latch in a second position is entirely outside the first tube;
    a second divider at a second end of the header frame opposite the first end, the second divider defining a second tube therein, the second tube structured to slidingly receive a second divider point;
    a second latch, wherein the second latch in a first position is partially within the second tube, and wherein the second latch in a second position is entirely outside the second tube;
    at least one harvesting tool carried by the header frame between the first divider and the second divider;
    a first spring configured to urge the first latch toward the first position; and
    a second spring configured to urge the second latch toward the first position.

5. The harvesting header of claim 4, wherein the first divider and the second divider are adapted for installation and removal of the first divider point and the second divider point by a single person.

6. The harvesting header of claim 4, wherein the first divider and the second divider are adapted for installation and removal of the first divider point and the second divider point by hand and without tools.

* * * * *